(No Model.)
H. M. BOIES.
CAR WHEEL.
No. 290,518. Patented Dec. 18, 1883.
Fig. 1.      Fig. 2.
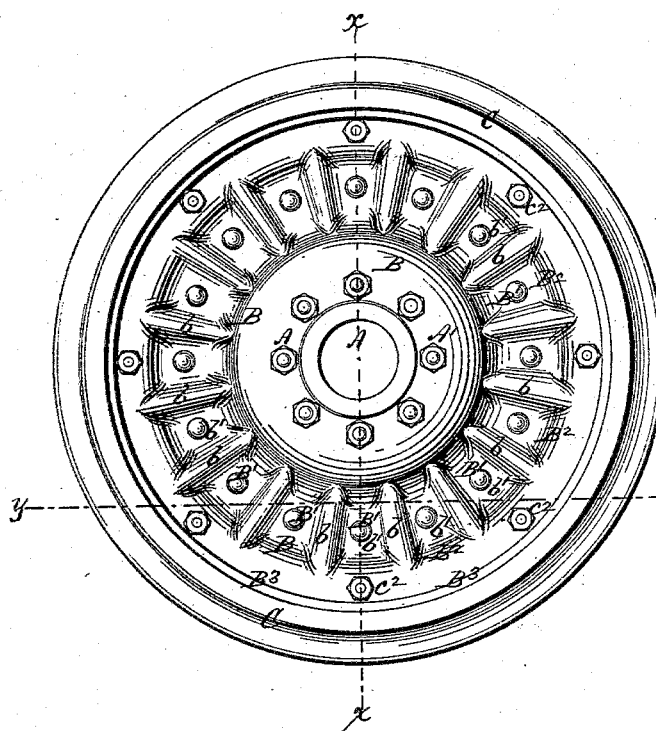
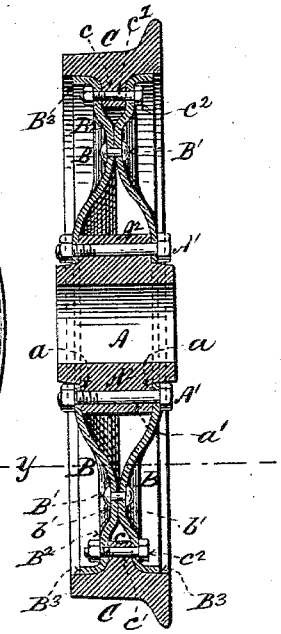
Fig. 3.
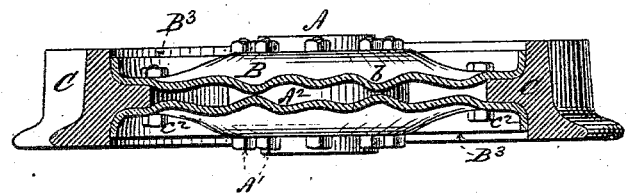
Witnesses:
R. C. Howes
M. L. Adams
Inventor:
Henry M. Boies
Per Edw. E. Luinsy
Atty.

UNITED STATES PATENT OFFICE.

HENRY M. BOIES, OF SCRANTON, PENNSYLVANIA.

CAR-WHEEL.

SPECIFICATION forming part of Letters Patent No. 290,518, dated December 18, 1883.

Application filed October 10, 1883. (No model.)

*To all whom it may concern:*

Be it known that I, HENRY M. BOIES, of Scranton, in the State of Pennsylvania, have invented a certain Improvement in Wrought-Metal Car-Wheels, of which the following is a specification.

My improvement relates to that class of car-wheels in which the tires are secured to the peripheries and the hubs to the centers of annular metallic plates; and my invention consists in uniting the tire to the hub by means of two radially-corrugated dished plates bolted together, and preferably having their peripheries turned outward to afford bearings for the tire and offset near their peripheries, to provide an annular groove for the reception of a tongue formed upon the inner surface of the tire. This tongue is transversely perforated to receive the bolts or rivets by which the plates are fastened to the tire. Another series of bolts or rivets may, if desired, be used to secure the plates to each other. The inner portions of the plate, in addition to being radially corrugated, swell outward, and are provided with central bearings, respectively, upon annular shoulders formed at opposite ends of the hub. The projecting portion of the hub inclosed by the inner edges of the plates is perforated to receive the bolts or rivets by which the plates are fastened to the hub.

The accompanying drawings of a car-wheel illustrating my invention are as follows, viz:

Figure 1 is an elevation of the face of the wheel. Fig. 2 is a section through the line X X on Fig. 1. Fig. 3 is a section through the line Y Y, on Fig. 1, showing the radial corrugations in cross-section.

The drawings represent a car-wheel provided with the hub A, perforated as usual for the reception of the axle. At its opposite ends the hub is reduced in diameter to provide the annular shoulders $a\ a$, which afford the bearings for the central portions of the plates B, which are secured to the hub by means of the bolts or rivets A', inserted through the plates and through the holes $a'$, formed in the projecting portion $A^2$ of the hub. The plates B are dished, and have formed in them the radial corrugations $b$, so that at a point between the hub and the tire C the portions $b'$ of the plates respectively acquire contact with each other. The portions in contact may, if desired, be fastened together by the bolts or rivets B'. Near their peripheries the plates are provided with offsets $B^2$, for embracing the opposite sides of the annular tongue $c$, formed upon the inner surface of the tire, and having the perforations $c'$, to receive the bolts $c^2$, by which the plates are fastened to the tire. The peripheries of the plate are preferably bent outwardly, forming the flanges $B^3$, for bearing upon the interior of the tire outside of the base or the tongue $c$. I preferably employ steel for the tire and for the plates.

The thickness of the plates may be varied, as desired; but ordinarily it will be about half an inch. Steel plates of this thickness may be struck up in the described form by suitable dies. The radial corrugations impart great strength to the plates, and a desirable degree of elasticity is given the wheel by the dishing or annular corrugation of the plates.

By this mode of construction the wheel is made comparatively light and yet possesses great strength and durability.

I claim as my invention—

The wrought-metal car-wheel herein described, the same consisting, essentially, of a suitably shouldered and perforated hub, two radially-corrugated dished plates offset near their peripheries, a tire provided upon its interior with a perforated projecting tongue seated in the annular groove formed by the offsets in the plates, and suitable bolts or rivets fastening the dished plates to each other and to the hub and tire, respectively.

HENRY M. BOIES.

Witnesses:
JOHN D. SHERER,
L. M. HORTON.